United States Patent [19]
DeMuro

[11] Patent Number: 5,506,490
[45] Date of Patent: Apr. 9, 1996

[54] METHOD AND APPARATUS FOR DETERMINING EXTERNAL POWER SUPPLY TYPE

[75] Inventor: David M. DeMuro, Cary, Ill.

[73] Assignee: Motorola, Inc., Schaumburg, Ill.

[21] Appl. No.: 149,686

[22] Filed: Nov. 9, 1993

[51] Int. Cl.⁶ .................................................. H01M 10/46
[52] U.S. Cl. .............................. 320/23; 320/39; 320/56; 363/143
[58] Field of Search .......................... 320/2, 15, 22, 320/23, 24, 39, 40, 56; 363/142, 143

[56] References Cited

U.S. PATENT DOCUMENTS

| | | | |
|---|---|---|---|
| 4,232,260 | 11/1980 | Lambkin | 320/2 |
| 5,162,721 | 11/1992 | Sato | 320/15 |
| 5,164,652 | 11/1992 | Johnson et al. | 320/2 |
| 5,237,257 | 8/1993 | Johnson et al. | 320/2 |
| 5,369,352 | 11/1994 | Toepfer et al. | 320/56 |

Primary Examiner—Peter S. Wong
Assistant Examiner—Patrick Law
Attorney, Agent, or Firm—John J. King

[57] ABSTRACT

In summary, the present invention provides a method and apparatus for determining an external power supply type and modifying the charging of the internal battery (14) based upon the external power supply type and battery information. The device has an external power adapter (12) used to provide power to the device (10), as well as charging current for the battery which is regulated by the internal battery charger. A microcontroller (20) in the device (10) regulates the charging current to the battery (14). The microcontroller (20) preferably contains an A/D converter (21) which is connected to a pull-up resistor (32) internal to the device, and to a pull-down resistor (34) in the external power adapter (12). The voltage generated by the resistor divider network including the pull-up resistor (32) and the pull-down resistor (34) in the external power adapter is used to identify the external power adapter type. By changing the value of the pull-down resistor (34) in the external power supply to identify the external power supply, the microcontroller (20) in the apparatus may determine the optimum charging profile to use for the battery based upon the charger type and other information relating to the battery.

20 Claims, 4 Drawing Sheets

54

5,506,490

METHOD AND APPARATUS FOR DETERMINING EXTERNAL POWER SUPPLY TYPE

FIELD OF THE INVENTION

The present invention is generally related to power adapters, and more particularly to a method and apparatus for determining the type of external power adapter and modifying operating characteristics based upon the external power adapter type.

BACKGROUND OF THE INVENTION

In a portable, battery-powered device such as a cellular telephone, an external power input is usually provided so that the user can operate the device from a primary source of power such as house current or a vehicle's power source in order to conserve battery power. It is also desirable to have a battery charger internal to the device for recharging the unit's battery pack, which may be internal or external to the device. The device and its internal battery charger require a power supply or adapter external to the device to supply the proper voltage and current needed by the device to charge the internal battery or power the device.

Further, there are often a variety of external power supplies. For example, a high power version may be offered for fast charging the battery, while a low cost, low power version may be offered for slow charging the battery. Because the operation of the internal charger will differ depending on which external adapter is connected, the device must sense which type of external power adapter is present.

Accordingly, there is a need to provide a means for detecting the type of external power adapter which is connected to a device, and modify the operation of the apparatus as a function of the type of power adapter and battery. The invention leads to greater system flexibility and improved performance with all types of external power supplies.

DESCRIPTION OF THE PREFERRED EMBODIMENT

Figure 1:
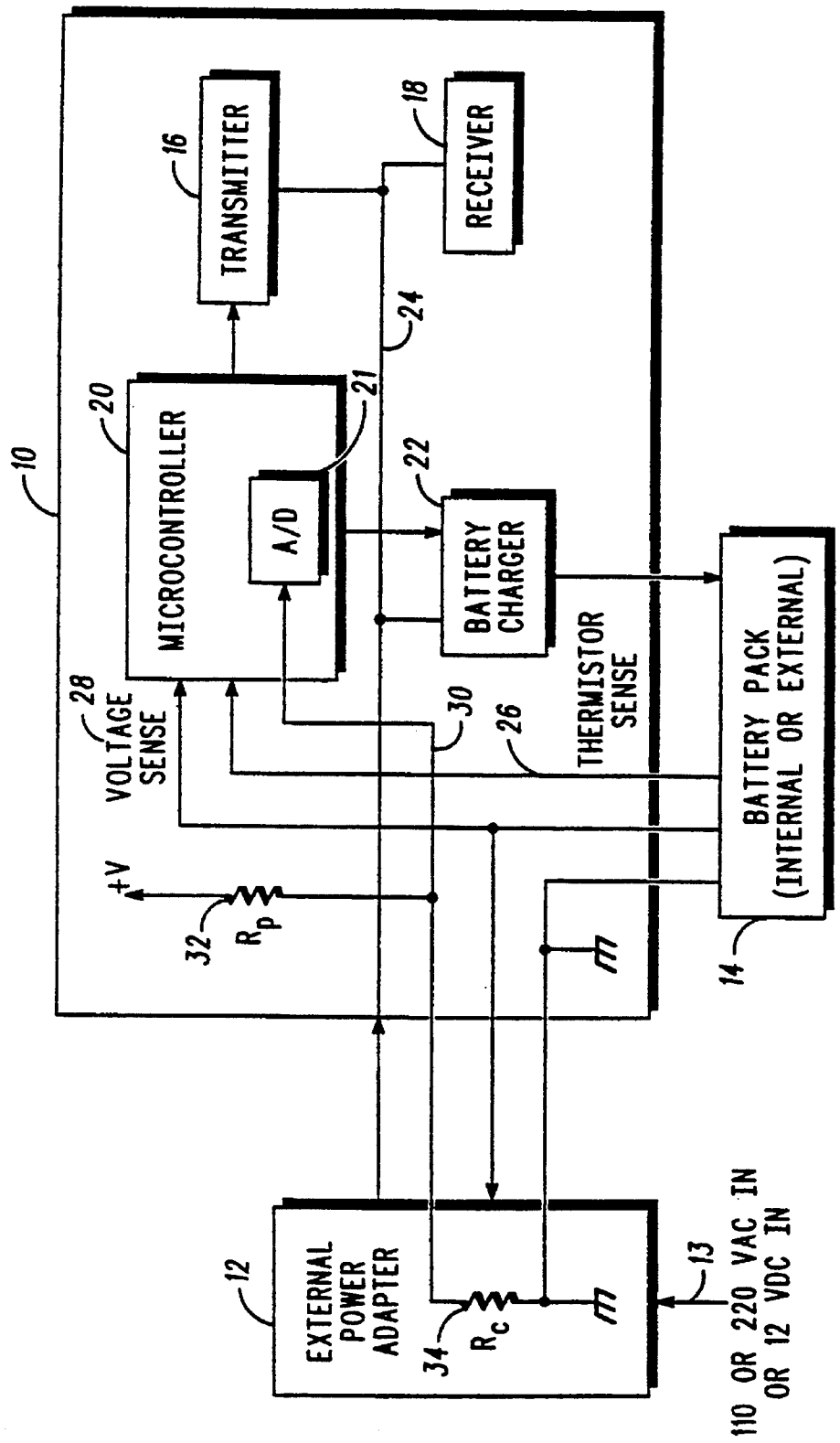
FIG. 1 is a block diagram of an apparatus for determining external power adapter type according to the present invention.

The present invention provides a method and apparatus for determining an external power adapter type. FIG. 1 generally shows a device having an external power adapter used to provide power to the device, as well as charging current for a battery which is regulated by the internal battery charger. A microcontroller in the device regulates the charging current to the battery. The microcontroller preferably contains an A/D converter which is connected to a pull-up resistor internal to the device, and to a pull-down resistor in the external power adapter. The power adapter is essentially a regulated power supply which may be connected to a primary source of power such as the AC line, or to a 12 VDC supply in an automotive application.

The external power adapter may be of a high current, high power type capable of fast charging the battery, or alternatively, it may be of a low current type which is only capable of slow charging the battery. By changing the value of the pull-down resistor in the external power adapter to identify the external power adapter type, the microcontroller in the apparatus may determine the optimum charging profile to use for the battery based upon the charger type and other information relating to the battery.

Referring specifically to the elements shown in FIG. 1, a portable device 10 has an attached external power adapter 12 which is powered by way of line 13. Portable device 10 also includes a battery 14 which could be either internal or external to the portable device. By way of example, the portable device 10 could a portable cellular telephone having a transmitter 16 and a receiver 18. However, it will understood that any other device, portable or fixed, adapted to receive external power could employ the apparatus and method of the present invention. Transmitter 16 is controlled by a microcontroller 20 having an analog-to-digital converter 21. Portable device 10 also includes a battery charger 22. Transmitter 16, receiver 18, and battery charger 22 are all powered by a line 24 from external adapter 12.

Generally, battery 14 will include a sensing element such as a resistor, thermistor, open circuit, short circuit or other element which may provide auxiliary sensing capability. Operationally, batteries of different types exhibit different "end of life" voltage characteristics and effective series resistances. Since different types of batteries can be interchangeably used to provide power for the same equipment (i.e. for a Cellular Portable Telephone), knowledge of the type of battery may be useful to the equipment in establishing operating parameters such as transmitter output power or a "low battery" warning condition. Battery types that can be charged should be charged at differing rates and with differing conditions. Also, non-rechargeable battery types should not be subjected to recharging attempts.

A portable telephone having battery charger which accepts all battery types ideally should adapt the rate of charge (charge current) and the types of charge controls used in accordance with the battery type. It is known for a device to automatically recognize the battery type which is to be charged and adapt its charging parameters accordingly. Applicants herein incorporate by reference U.S. Pat. No. 5,164,652 entitled "Method and Apparatus for Determining Battery Type and Modifying Operating Characteristics", invented by Robert M. Johnson and Michael P. Metroka and assigned to Motorola, Inc. assignees of the present invention. U.S. Pat. No. 5,164,652 describes a battery type detector for battery-using and battery-charging equipment.

The U.S. Pat. No. 5,164,652 also discloses modifying operational characteristics of the equipment in accordance with the battery-type detected. A battery sense line 26 and a voltage sense line 28 coupled from the battery to microcontroller 20 provide the necessary information to optimize battery charging according to U.S. Pat. No. 5,164,652. Microcontroller 20 contains predetermined information about the battery type and will establish the rate and type of charge controls to provide an optimum rate of charge for a rechargeable battery while not charging a non-chargeable battery type. The microprocessor recalls from its internal memory the charging characteristics of the particular battery type. The battery terminal voltage is sensed by conventional voltage detection techniques and input to microprocessor 20 where it is compared with the battery terminal voltage charge characteristic curve recalled from storage. The appropriate amount of current is allowed to enter the battery terminals as determined by microprocessor and the external power adapter.

An external power sense line 30 is coupled from external power adapter 12 to portable device 10 at microcontroller 20. Portable device 10 includes a pull-up resistor 32 coupled to the external power sense line 30. Similarly, external power adapter 12 includes a pull-down resistor 34 (type-detection resistor) which is also coupled to external power sense line 30. The pull-up resistor 32 and the pull-down resistor 34 form a voltage divider network which generates a voltage identifying the type of external power adapter In the preferred embodiment, the device is compatible with older power supplies which do not contain a type detection resistor. Older power supplies do not contain the necessary voltage tracking circuit, or may not provide sufficient voltage to charge the attached battery under all conditions. The device may determine that an older power supply is connected by recognizing the lack of a type detection resistor. In this case, the input to A/D circuit 21 is pulled to +V by pull-up resistor 32, and thus the microcontroller is able to detect the lack of pull-down resistor 34 in the external adapter. Thus, the microcontroller may disable the internal charger to prevent charging with older power supplies.

As shown in the following Table 1, different external power supplies which could be attached to the device are listed. Generally, the charger type is listed in the second column. Also, as shown in the third column, an external adapter could be attached to a device which is in a test mode. The preferred value for resistor 34 is listed in column 4.

TABLE 1

| Charger # | Charger Type | Test Mode | Resistor | Voltage |
|---|---|---|---|---|
| 1 | Non | Off | Open | $V_1$ |
| 2 | Fast | Off | 33K | $V_2$ |
| 3 | Slow | Off | 10K | $V_3$ |
| 4 | — | On | 3.3K | $V_4$ |
| 5 | Other | Off | 3.0K | $V_5$ |
| . | . | . | . | . |
| . | . | . | . | . |
| . | . | . | . | . |

While five different external power adapters are listed in Table 1, any number of adapters could be used within the scope of the present invention.

As shown in Table 2, an example of the A/D conversion is shown for a device adapted to receive 5 external power adapters. The associated voltage value generated by a resistor 32 (having a value of 10K) and a resistor 3 (having a value listed in Column 2) is listed in column 3. While the A/D count range and guard band are given by way of example, other ranges and guard bands could be used. Alternatively, a different number of input devices could be employed and different resistor values, voltages, A/D count range and guard bands could be established.

TABLE 2

| State | Resistor | Voltage | A/D Count Range | Guard Band |
|---|---|---|---|---|
| 1 | Open | 2.75 | 0–9 | 10–31 |
| 2 | 33K | 2.11 | 32–76 | 77–98 |
| 3 | 10K | 1.37 | 99–150 | 151–168 |
| 4 | 3.3K | 0.63 | 169–217 | 218–234 |
| 5 | 3.0K | 0.00 | 235–255 | — |

Figure 3:
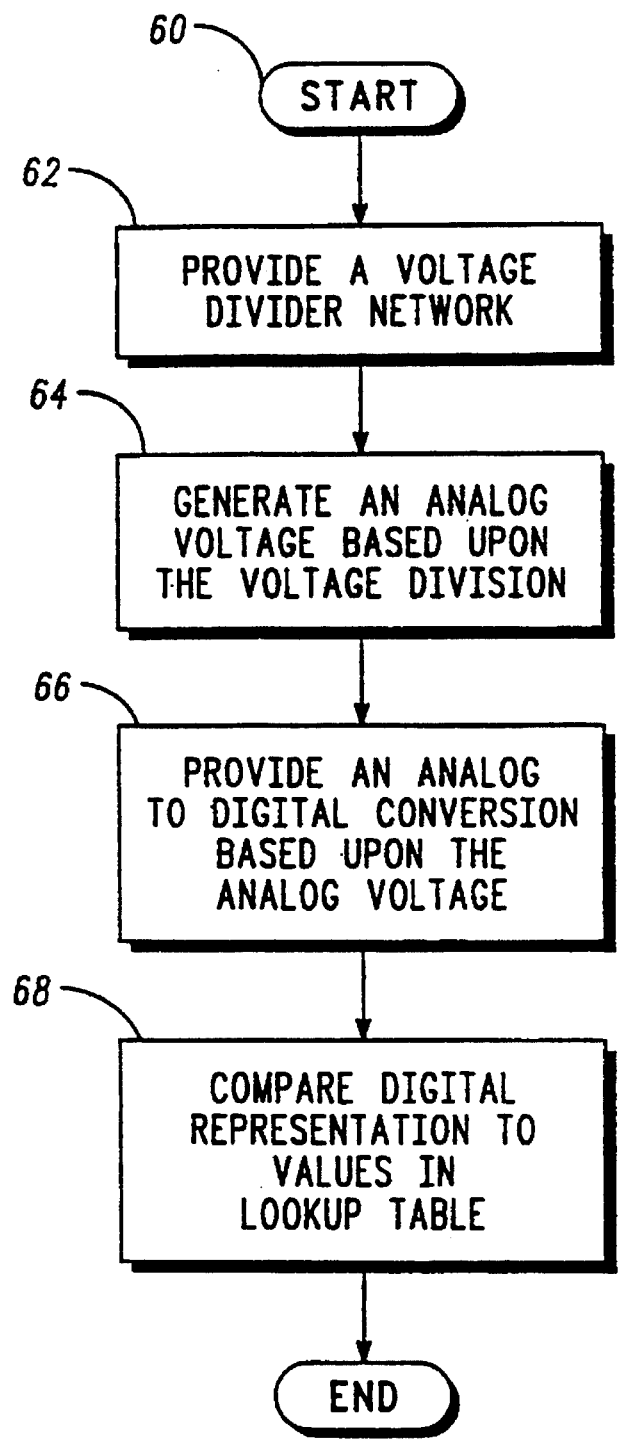
FIG. 3 is a flow chart showing the method for determining external power adapter type according to the present invention.

While an A/D converter is preferably employed to determine the type of external power adapter, a logic circuit similar to that shown in FIG. 3 of U.S. Pat. No. 5,164,652, which is incorporated by reference, could alternatively be employed to determine the type of external adapter within the scope of the present invention.

Figure 2:
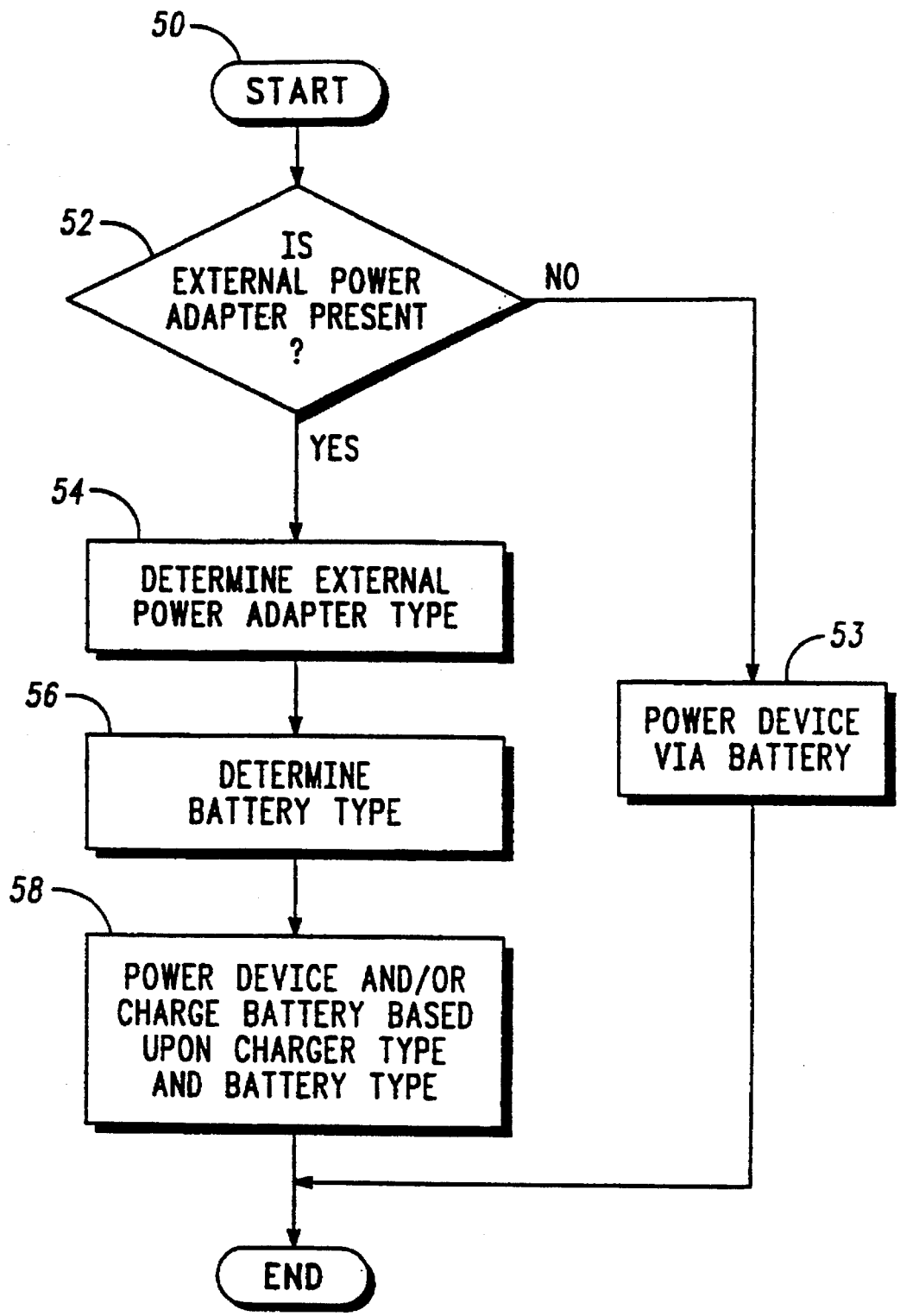
FIG. 2 is a flow chart showing the operation of a portable device having an external power adapter according to the present invention.

Turning now to FIG. 2, a flow chart shows the operation of a device having an external power adapter according to the present invention. When the device is operated at a step 50, the presence of an external adapter is determined at step 52. If no external power adapter is present, the device is powered by the battery at a step 53. If an external power adapter is present, the type of adapter is determined at step 54. The method for determining the external battery type will described in detail in reference to FIG. 3, and can be accomplished by the apparatus of FIG. 1.

Regardless of whether an external power adapter is present or not, the battery type is determined at step 56. This can be accomplished by the apparatus and methods described in U.S. Pat. No. 5,164,652. Finally, at a step 58, the telephone is powered by the battery (or adapter if present), or the battery is optimally charged by the adapter, if present, based upon the type of battery and type of external power adapter attached to the device. That is, the charging parameters are modified according to the type of battery and the capability of the charger according to U.S. Pat. No. 5,164,652. The method for powering/charging a portable device having an external power adapter according to the present invention is described in detail in reference to FIG. 4.

Turning now to FIG. 3, a flow chart shows the method for determining external power adapter type according to the present invention. A voltage divider network is created between the external power adapter and the portable device at a step 62. The voltage divider network can be provided according to the present invention by coupling a first resistor in the external power adapter to a second resistor in the portable device, as shown for example in the apparatus of FIG. 1. At a step 64, a voltage generated by the voltage divider is provided to a microcontroller or some other control circuit in the portable device. Preferably, the voltage is then converted to a digital equivalent in an A/D converter in the microcontroller at a step 66. The digital conversion is then compared to a voltage lookup table in the microcontroller at a step 68 to determined the external power adapter type. While an analog to digital conversion is preferred, the analog signal could alternatively be compared to values in a look-up table.

Figure 4:
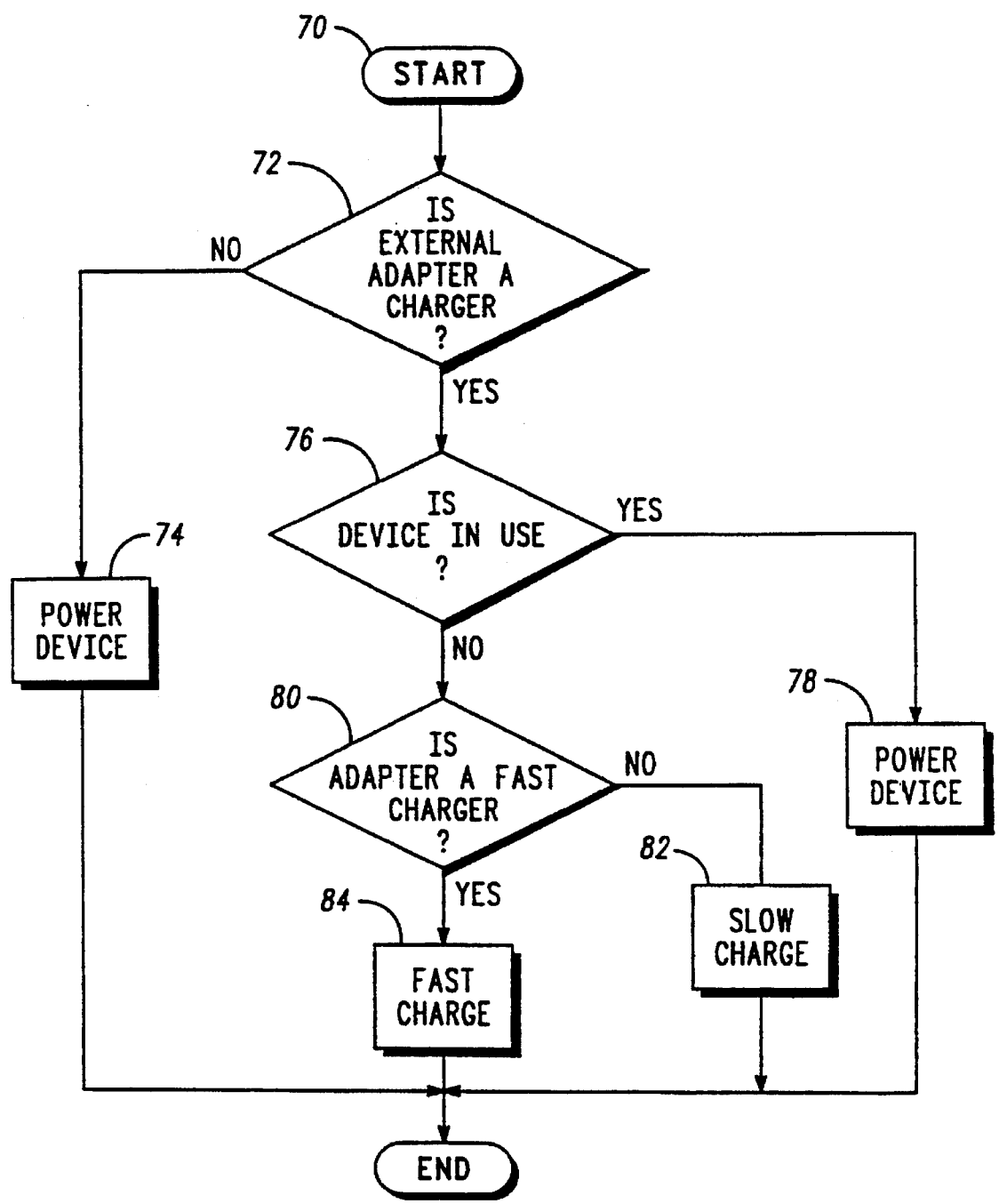
FIG. 4 is a flow chart showing the method for powering/charging a portable device having an external power adapter according to the present invention.

Turning now to FIG. 4, a flow chart shows the method for powering/charging a portable device having an external power adapter according to the present invention. At a step 72, if the external adapter is not a charger, the external power adapter will only power the portable device at a step 74. If the adapter is a charger, the telephone will determine whether the device is in use at a step 78. For example, with a portable cellular telephone, it will be determined whether the telephone is in an "off hook" condition. If the device is in use, the external adapter will only power the device at a step 78. However, if the device is not in use, the device will determine whether the charger is a fast charger or a slow charger at a step 80. This can be determined according to the apparatus (FIG. 1) and method (FIG. 3) described above. If the device is not in use and the device is a not a fast charger, the external adapter will slow charge the battery at step 82. If the device is not in use and the device is a fast charger, the external adapter will fast charge the battery at a step 84. However, it will be understood that a power adapter could charge a battery while powering the device.

In summary, the present invention provides a method and apparatus for determining an external power adapter type and preferably modifying the charging of the internal battery based upon the external power adapter type and battery information. The device has an external power adapter used to provide power to the device, as well as charging current for the battery which is regulated by the internal battery charger. The power adapter is essentially a regulated power supply which may be connected to the AC line, or to 12 VDC supply in an automotive application. The external power adapter may be of a high current, high power type capable of fast charging the battery pack, or alternatively, it may be of a low current type which is only capable of slow charging the attached battery. A microcontroller in the device regulates the charging current to the battery. The microcontroller preferably contains an A/D converter which is connected to a pull-up resistor internal to the device, and to a pull-down resistor in the external power adapter. The voltage generated by the resistor divider network is used to identify the external power adapter type. By changing the value of the pull-down resistor in the external power adapter to identify the external power adapter, the microcontroller in the apparatus may determine the optimum charging profile to use for the battery based upon the charger type and other information relating to the battery.

I claim:

1. An apparatus for identifying an external power adapter attached to an electronic device, said external power adapter for receiving a source of primary power and providing a power input to said electronic device, the apparatus comprising:

a resistor network having a first resistor and a second resistor, said first resistor being disposed within said external power adapter and operatively coupled to said second resistor disposed within said device, said resistor network generating a sense voltage associated with said external power adapter; and a control circuit disposed within said electronic device adapted to receive said sense voltage to identify said external power adapter.

2. The apparatus for identifying an external power adapter according to claim 1 wherein said external power adapter is a regulated power adapter receiving said source of primary power from an alternating current line.

3. The apparatus for identifying an external power adapter according to claim 1 wherein said external power adapter is a regulated power supply receiving said source of primary power from a direct current source.

4. The apparatus for identifying an external power adapter according to claim 1 further including a battery integrally connected to said device.

5. The apparatus for identifying an external power adapter according to claim 4 further including a battery charger disposed within said device for receiving a power input from said external power adapter to charge said battery.

6. The apparatus for identifying an external power adapter according to claim 5 further including a sense line from said battery providing a signal identifying the battery type of said battery.

7. The apparatus for identifying an external power adapter according to claim 6 wherein said control circuit regulates said charger circuit to charge said battery based upon said external power adapter type and said battery type.

8. An apparatus comprising:

an external power adapter adapted to receive a power input from a primary source of power;

a portable device adapted to receive said power input from said external power adapter and generate a regulated voltage;

a resistor network having a first resistor and a second resistor, said first resistor being disposed within said external power adapter and operatively coupled to said second resistor disposed within said portable device and coupled to said regulated voltage, said resistor network generating a sense voltage for identifying the type of said external power adapter; and a microcontroller disposed within said portable device adapted to receive said sense voltage identifying said type of said external power adapter.

9. The apparatus according to claim 8 wherein said microcontroller further includes an analog to digital converter to convert said sense voltage to a digital signal.

10. The apparatus according to claim 8 further including a battery integrally connected to said portable device.

11. The apparatus according to claim 10 further including a charger circuit disposed within said device, said charger circuit for receiving said power input from said external power adapter to charge said battery.

12. The apparatus according to claim 11 further including a sense line from said battery providing a signal identifying the battery type of said battery.

13. The apparatus according to claim 12 wherein said control circuit regulates said charger circuit to charge said battery based upon a charger type and said battery type.

14. A method for identifying an external power adapter coupled to a device, said method comprising the steps of:

coupling a first resistive element positioned within the external power adapter to a second resistive element positioned within the device to create a resistor divider network;

generate an external power adapter sense voltage based upon a reference voltage; and identify the external power adapter by the external power adapter sense voltage.

15. The method for identifying an external power adapter according to claim 14 further including a step of recharging a battery based upon the identity of an external power adapter type.

16. A portable electronic device for identifying a type of an external power adapter attached thereto for receiving a source of primary power and providing power input to said electronic device, the portable electronic device comprising:

a resistor being disposed within said portable electronic device, said resistor corresponding to one of a plurality of components forming a network generating a sense voltage associated with said external power adapter; and a control circuit disposed within said portable electronic device adapted to receive said sense voltage to identify said external power adapter.

17. The portable electronic device for identifying an external power adapter according to claim 16 further including a battery integrally connected to said portable electronic device.

18. The portable electronic device for identifying an external power adapter according to claim 17 further including a battery charger disposed within said portable electronic device for receiving power from said external power adapter to charge said battery.

19. The portable electronic device for identifying an external power adapter according to claim 18 further including a sense line from said battery providing a signal identifying the type of said battery.

20. The portable electronic device for identifying an external power adapter according to claim 19 wherein said control circuit regulates said charger circuit to charge said battery based upon said external power adapter type and the type of said battery.

* * * * *